(12) United States Patent
Iwazumi

(10) Patent No.: US 7,391,308 B2
(45) Date of Patent: Jun. 24, 2008

(54) MONITORING DEVICE, TRANSCEIVER SYSTEM AND ITS CONTROL METHOD

(75) Inventor: Keiichi Iwazumi, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 154 days.

(21) Appl. No.: 11/117,334

(22) Filed: Apr. 29, 2005

(65) Prior Publication Data

US 2005/0258949 A1  Nov. 24, 2005

(30) Foreign Application Priority Data

May 21, 2004  (JP)  ............................. 2004-151259

(51) Int. Cl.
*B60C 23/02* (2006.01)
(52) U.S. Cl. .................. 340/442; 340/444; 340/445; 340/446; 340/447; 340/449; 73/146.3; 73/146.4; 116/34 R
(58) Field of Classification Search ................. 340/442, 340/444, 445, 446, 447, 449, 686.1; 200/61.22; 116/34 R; 73/146.3, 146.4, 116.5; 701/29, 701/74
See application file for complete search history.

(56) References Cited

U.S. PATENT DOCUMENTS

| 6,271,748 B1 | 8/2001 | Derbyshire et al. |
| 6,518,875 B2 * | 2/2003 | DeZorzi .................... 340/442 |
| 6,545,599 B2 * | 4/2003 | Derbyshire et al. ......... 340/442 |
| 6,545,899 B1 | 4/2003 | Derbyshire et al. |
| 6,922,142 B2 | 7/2005 | Norimatsu |
| 6,963,274 B2 * | 11/2005 | Saheki et al. ............... 340/447 |
| 2002/0044050 A1 | 4/2002 | Derbyshire et al. |
| 2004/0046651 A1 | 3/2004 | Norimatsu |
| 2005/0078002 A1 * | 4/2005 | Okubo |

FOREIGN PATENT DOCUMENTS

| JP | 10-504783 | 5/1998 |
| JP | 2003-237327 | 8/2003 |
| JP | 2004-098835 A | 4/2004 |

* cited by examiner

Primary Examiner—Hung Nguyen
(74) Attorney, Agent, or Firm—Foley & Lardner LLP

(57) ABSTRACT

A transmitter module has a sensor module that includes a plurality of sensors and operates intermittently, a signal processor module that permits transmission of an output of the sensor module to a receiver module at given permission timings, a radio transmission module that wirelessly transmits data when the transmission is permitted, and a power source that supplies power to each module. The signal processor module has a microcomputer and an interval timer that outputs a first timing signal when a count value corresponds to a set value. The microcomputer is activated by the first timing signal and changes the set value in a compare register according to a vehicle operation state.

23 Claims, 5 Drawing Sheets

MONITORING DEVICE, TRANSCEIVER SYSTEM AND ITS CONTROL METHOD

BACKGROUND OF THE INVENTION

1. Field of the Invention

The present invention relates to a monitoring device which has a state detection sensor for detecting the state of a monitored object and a motion sensor for detecting the physical motion of a monitored object, a transceiver system which transmits a detection result of the state detection sensor, and a control method of the transceiver system.

2. Description of Related Art

Recently, safety regulations are enhanced in both Japan and the U.S. Transportation Recall Enhancement, Accountability and Documentation (TREAD) Act enforced in North America establishes a new standard that requires the installation of a tire pressure monitoring system (TPMS). The standard applies to new vehicles marketed after 2006. There are currently two types of TPMS: direct and indirect. Direct measurement systems directly measure the tire pressure. Indirect measurement systems measure the displacement of a tire during driving and calculate the tire pressure.

The indirect measurement systems monitor the tire pressure by detecting a decrease in air pressure from a difference in the rotational speed of the left and right wheels with use of a wheel speed sensor used in Anti Lock Brake System (ABS). The systems require substantially no additional cost as long as ABS is installed. However, the systems have drawbacks that air pressure measurement accuracy is lower than direct measurement systems, an air pressure is not detectable if air pressure decrease happens in all four tires, and a measurement error occurs when a tire size is changed, and so on. Therefore, not a few consumers' groups in the U.S. are anxious about monitoring with the indirect measurement systems.

On the other hand, the direct measurement systems measure an air pressure and temperature with a sensor placed in each tire. This system installs a sensor unit in a valve of a tire and monitors all four tires individually. This system therefore has a high monitoring accuracy and allows monitoring of the tire pressure even during parking or stopping. Being more accurate than the indirect systems, the direct systems are expected to prevail over time.

One of the direct measurement systems is a system that measures a tire pressure at regular time intervals, wirelessly transmits the information to a vehicle and displays the information for a driver. This system is composed of a radio transmitter module installed in a tire wheel and a radio receiver module installed in a vehicle body. The transmitter module consists of a sensor module, a signal processor module, and a radio transmitter module. The sensor module includes a plurality of kinds of sensors for detecting pressure, temperature, and so on. The signal processor module processes the data transmitted from the sensor module. The radio transmitter module modulates the data transmitted from the signal processor module and wirelessly transmits the modulated data. Each module is a semiconductor device and thus requires power supply. A battery is generally used to supply power to the modules. The transmitter module is installed inside a tire wheel, and a battery is directly soldered to the transmitter module body to protect from vibration. Replacement of a battery is therefore difficult and thus performed when replacing or discarding the tire. For this reason, improvement in battery life is critical for tire pressure monitoring systems and monitoring methods.

Meanwhile, recent vehicles have more and more electric components and power demand increases accordingly. Lower power consumption is therefore required also for receiver modules installed in vehicle bodies.

A tire internal pressure warning device that aims at solving the above problems is described in Japanese Unexamined Patent Application Publication No. 2003-237327, which is referred to hereinafter as "related art". FIG. 5 is a block diagram showing a transmitter module of the tire internal pressure warning device of the related art. As shown in FIG. 5, the tire internal pressure warning device 101 has a transmitter module 111 installed in a tire and a receiver module 131 installed in a vehicle.

The transmitter module 111 includes a sensor unit 112, a signal processor unit 113, a transmitter unit 114, and a power source 115. The sensor unit 112 consists of a pressure sensor 121, a centrifugal force sensor 112, a temperature sensor 123, and a voltage sensor 124. The signal processor unit 113 processes the signal detected by the sensor of the sensor unit 112. The transmitter unit 114 transmits a processing result to the receiver module 131. The power source 115 supplies electrical power to the three units.

The signal processor unit 113 generates a clock 1 of 10-second period and a clock 2 of 60-minute period, for example.

The pressure sensor 121 in the transmitter module 111 is driven by an interrupt signal of the clock 1. At this time, a Central Processing Unit (CPU) in the signal processor unit 113 is also driven. Specifically, upon input of the clock, the pressure sensor 121 reads out the previous pressure data stored therein and transmits it to the signal processor unit 113. At the same time, the pressure sensor 121 measures the present pressure data and stores it therein. The signal processor unit 113 determines if the previous pressure data transmitted from the pressure sensor 121 is a predetermined value or higher, thereby determining if the pressure is within the normal range or not. If the pressure data is normal, the pressure sensor 121 is set to standby until the next power supply.

On the other hand, if the pressure value is abnormal, the centrifugal force sensor 122 measures a centrifugal force. If the measurement result shows DRIVE, the signal processor unit 113 reads out the pressure data measured last time and stored in the pressure sensor 121 and transfers it to the transmitter unit 114. The transmitter unit 114 wirelessly transmits the data to the receiver module 131 in the vehicle through the transmitter antenna 125. After that, the pressure sensor 121 enters the standby state and waits for the next synchronous clock to input.

If, on the other hand, the centrifugal force sensor 122 does not detect a centrifugal force, the pressure sensor 121 enters the standby state without performing radio transmission in normal cases. Only in the case where there is an interrupt signal of the clock 2, a start bit period at the start of a radio signal is set longer than a radio signal during driving, radio transmission is performed, and it returns to the standby state. This is because the receiver module 131 is activated intermittently asynchronous with the transmitter unit 114 during stopping and assured data reception is desired.

When the vehicle main switch is on, the receiver module 131 is always in the operation state. When the vehicle main switch is off, the receiver module 131 repeats intermittently the operation state and the standby state not in synchronization with the transmitter unit 114. This technique suppresses power consumption of the transmitter module 111 and the transmitter module 131 by repeating the above operations.

The technique of the related art has the scope for further power consumption reduction. Specifically, though the activation and the standby are repeated in the intermittent activation operation of the power supply 115, this period is not variable. Therefore, the CPU in the signal processor unit 113 and the pressure sensor 121 are intermittently activated in a relatively short period during parking as well as during driving. However, it is sometimes unnecessary to monitor the tire pressure in such a short cycle during parking, and a current consumed in the CPU and the pressure sensor 121 at this time is redundant.

SUMMARY OF THE INVENTION

According to one aspect of the invention, there is provided a transceiver system which includes a transmitter device for monitoring a state of a monitored object and transmitting a monitoring result and a receiver device for receiving data from the transmitter device. The transmitter device has a sensor unit including a state detection sensor detecting the state of the monitored object, and a motion sensor detecting a physical operation of the monitored object, a transmitter signal processor section causing the state detection sensor to operate according to an output of the motion sensor, and a transmitter section transmitting a detection result of the state detection sensor.

Since the transmitter signal processor section causes the state detection sensor to operate for monitoring the monitored object in accordance with the output of the motion sensor, it is possible to monitor the monitored object efficiently and suppress power consumption in a monitoring device.

According to another aspect of the invention, there is provided a control method of a transceiver system including a transmitter device including a sensor unit having a state detection sensor detecting a state of a monitored object and a motion sensor detecting a physical operation of the monitored object, and a transmitter section transmitting a detection result of the state detection sensor; and a receiver device receiving data from the transmitter device. The control method includes detecting by the motion sensor the physical operation of the monitored object; and causing the state detection sensor to operate according to a detection result of the physical operation.

According to yet another aspect of the invention, there is provided a monitoring device which includes a state detection sensor detecting a state of a monitored object; a motion sensor detecting a physical operation of the monitored object; and a signal processor section causing the state detection sensor to operate according to an output of the motion sensor.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

The invention will be now described herein with reference to illustrative embodiments. Those skilled in the art will recognize that many alternative embodiments can be accomplished using the teachings of the present invention and that the invention is not limited to the embodiments illustrated for explanatory purposed.

A preferred embodiment of the present invention is described in detail with reference to the drawings. This embodiment applies the present invention to a tire pressure monitoring system which includes a radio transmitter module installed in a tire and a radio receiver module installed in a vehicle body so that the receiver module directly measures and monitors the tire pressure.

The tire pressure monitoring system of this embodiment changes an interruption period of an interval timer adequately according to the vehicle operation state such as stopped or driving. The interval timer is placed in a signal processor module of the transmitter module and makes interruption occur periodically. Further, though a receiver module is normally intermittently activated asynchronously in time with the transmission from a transmitter module, the intermittent activation timing is synchronized with the transmission in this embodiment by indicating the transmission timing by the transmitter module.

In this system, the current consumed in the signal processor module and each sensor can be appropriate and saved in the transmitter module, and the activation with no radio transmission can be avoided in the receiver module. This allows improving the battery life in the transmitter module and also reducing electrical load on a vehicle battery supplying power to the receiver module.

Figure 1:
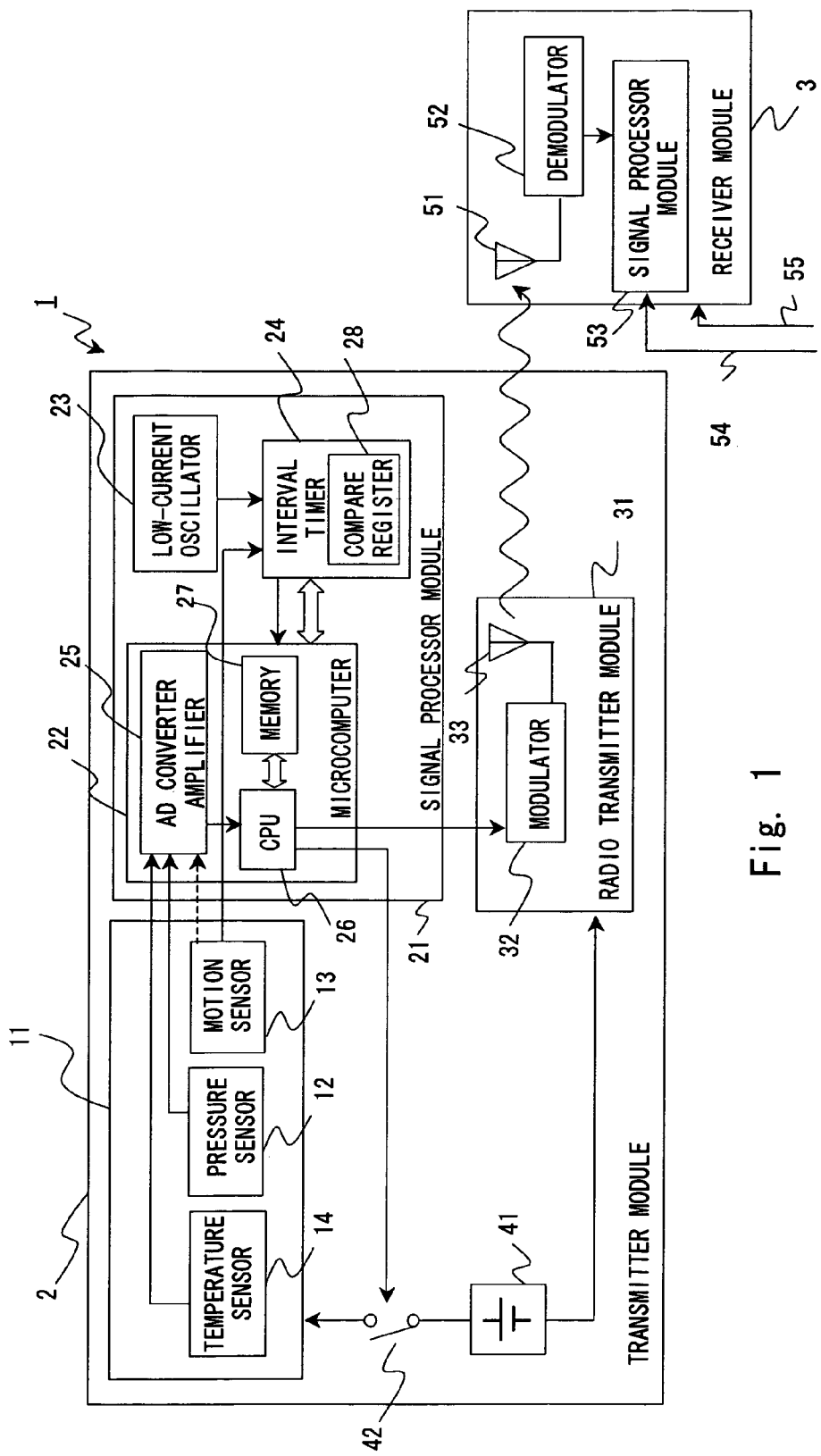
FIG. 1 is a block diagram showing a tire pressure monitoring system of an embodiment of the invention.

FIG. 1 is a block diagram showing the tire pressure monitoring system of this embodiment. As shown in FIG. 1, a tire pressure monitoring system 1 has a transmitter module 2 installed in a tire and a receiver module 3 installed in a vehicle body.

The transmitter module 2 includes a sensor module (sensor unit) 11 having plurality of sensors, a signal processor module 21, a radio transmitter module 31, and a power source 41 supplying power to each module. The signal processor module 21 processes the signal detected by the sensor module 11 and permits transmission of the output of the sensor module 11 to the receiver module 3 at a given permission timing. The radio transmitter module 31 wirelessly transmits the signal processed by the signal processor module 21 when the transmission is permitted.

The sensor module 11 operates intermittently, repeating the operation time and the stop time. When a switch 42 connecting the power source 41 and the sensor module 11 is turned on by a control signal from a microcomputer 22, power is supplied and the sensor module 11 starts operating. When the switch 42 is turned off by a control signal from the microcomputer 22, power supply is stopped and the sensor module 11 stops operating. This is repeated to perform intermittent operation.

The sensor module 11 consists of a pressure sensor 12 for measuring the tire pressure, a motion sensor 13 for detecting the driving or stopping of a vehicle, and a temperature sensor 14 for measuring the inner tire temperature. The motion sensor 13 is a sensor capable of detecting drive or stop of a vehicle, such as an acceleration sensor, an angular sensor or angular velocity sensor. The acceleration sensor has a bridge circuit composed of a centrifugal force switch in which the electrical state of a terminal changes by tire centrifugal force and a piezoelectric device, for example, and it detects by the electrical state the acceleration applied three-dimensionally. The angular sensor and the angular velocity sensor detect the angle and the angular velocity, respectively. The motion sensor 13 can thereby detect the physical state, driving or stopping, of a monitored vehicle, making it possible to determine the necessity of monitoring the monitored object. For example, if the vehicle is stopped for a long time or parked, the necessity of monitoring the tire pressure may be determined to be low.

The signal processor module 21 has a CPU 26, a microcomputer 22 as a transmitter control section, an interval timer 24 as a first timing signal generator section, and an oscillator (hereafter as low-current oscillator) 23 as a transmitter clock generator section. The signal processor module 21 processes the signal transferred from the sensor module 11.

The microcomputer 22 is activated by the first timing signal, which is detailed later, from the interval timer 24. The microcomputer 22 includes an analog to digital converter amplifier (hereinafter as A/D converter amplifier) 25, a memory 27, and a CPU 26. The A/D converter amplifier 25 analog-to-digital converts and amplifies the signal output from the sensor module 11. The memory 27 stores data K which indicates the operation state of the vehicle. The CPU 26 controls the interval timer 24, the radio transmitter module 31, the switch 42 and so on in accordance with the sensor output and the data K.

Upon input of the first timing signal, the microcomputer 22 outputs a control signal for turning on the switch 42 so as to supply power to the sensor-module 11. The sensor module 11 thereby starts operating, and the output of the motion sensor 13 is input to the interval timer 24. The interval timer 24 retains the present vehicle operation state obtained according to the sensor output. The microcomputer 22 reads it out and also reads out the data K indicating the vehicle operation state stored in the memory 27. The data K indicates the vehicle operation state as follows. If DRIVE is detected in the previous activation, K=0 is stored; if STOP is detected in succession, the number of times in succession is stored. Specifically, if the read data is K=1 and the present vehicle operation state is STOP, the data K is updated to K=2 and stored again in the memory 27. The microcomputer 22 can thereby detect the present and the past operation state of the vehicle. Though the data K contains only the number of stop times in this embodiment, it may further contain the number of drive times also.

The interval timer 24, which is detailed later, outputs a corresponding signal as the first timing signal when a count value corresponds to a first set value. The microcomputer 22 can change the first set value according to the data K. Specifically, if the data K is a large value, it determines that the vehicle is parked, not stopped, and changes the first set value to a larger value. This prolongs the cycle of generating the first timing signal, thereby reducing the frequency of activation of the microcomputer 22 and also reducing the frequency of power supply to the sensor module 11. This suppresses power consumption.

Further, the microcomputer 22 calculates the next time to transmit the output of the sensor module 11 based on the next time when the microcomputer 22 is activated or the next time when the first timing signal is output. The microcomputer 22 transmits the calculation result as estimated next transmission time data to the radio signal transmitter module 3 together with the output of the sensor module 11, which is the pressure data in this embodiment.

The interval timer 24 makes the microcomputer 22 generate interruption periodically and it operates asynchronously with and by a different clock from the microcomputer 22. The interval timer 24 always counts the count clocks output from the low-current oscillator 23. The interval timer 24 has a configuration register (hereinafter as compare register) 28 inside. It compares a set value X as a first set value set to a given value and a count value of the clock output from the low-current oscillator 23, and when the count value corresponds to the set value X, it generates an interrupt signal as the first timing signal.

The interval timer 24 has a register, not shown, that holds a comparative value of the motion sensor 13 in the electrical state by a centrifugal force. The electrical state of the motion sensor 13 becomes an intermediate potential during stopping due to high impedance while it becomes a ground potential during driving, for example. It is thereby possible to determine whether the vehicle is presently stopped (STOP) or driving (DRIVE) by comparing the value loaded to the register and the output of the motion sensor 13.

Specifically, when the microcomputer 22 is activated and the switch 42 is turned on so as to supply a voltage to the sensor module 11, the motion sensor 13 measures the vehicle operation state. The measurement result is input to the interval timer 24, and the detection result of STOP or DRIVE of the vehicle is stored into the register in such a way that STOP is 1 and DRIVE is 0, for example. The microcomputer 22 then reads out this data, thereby detecting the present vehicle operation state.

The low-current oscillator 23 supplies count clocks to the interval timer 24. It can operate at low current consumption. The low-current oscillator 23 and the interval timer 24 constitute a transmitter timing generator section. Further, the power source 41 and the switch 42 that determines whether to supply power from the power source 41 to the sensor module 11 constitute a power supply section for supplying power to the sensor module 11.

The microcomputer 22 receives no clock in the standby state. In this embodiment, the register for retaining data is stored in the interval timer 24 or the like where power is supplied constantly.

On the other hand, the receiver module 3 includes a receiving antenna 51 that receives a radio signal, a demodulator 52 that demodulates the received radio signal, and a signal processor module 53 that processes the demodulated signal. Unlike the transmitter module 2, the receiver module 3 has power supplied from a vehicle battery (54), not from the power source 41. The radio signal received by the receiving antenna 51 is demodulated by the demodulator 52 and processed by the receiver signal processor module 53.

The receiver signal processor module 53 is connected to a vehicle main key (55) and performs signal processing that outputs an alarm signal to a tire pressure warning device, not shown, upon detecting abnormal tire pressure. The receiver signal processor module 53 has basically the same configuration as the transmitter signal processor module 21 and it includes a microcomputer, a low-current oscillator, and an interval timer. The receiver microcomputer does not require the A/D converter amplifier 25 for A/D converting and amplifying an analog sensor output unlike the microcomputer 22 in the transmitter module 2.

The receiver signal processor module 53 may output an alarm signal if received pressure data exceeds a predetermined value, for example, or it may output the received pressure data as it is to an external warning device, display device, and so on so that a user monitors the tire pressure.

As described above, the receiver module 3 of this embodiment operates intermittently according to estimated next transmission time data. Thus, it is possible to perform intermittent operation in accordance with the time when a radio signal is transmitted from the transmitter module 2, thereby reducing load on the vehicle battery. In order to make sure to receive the radio signal to be transmitted next time, when the receiver module 3 receives the estimated next transmission time data, the signal processor module 53 is activated after a time period relatively shorter than the estimated next transmission time (hereinafter as next activation time) has passed. Specifically, a second set value determined by converting the estimated next transmission time into a clock count value is stored in a compare register of an interval timer. Then, the interval timer counts the clocks of the low-current oscillator as in the transmitter module 2, and, when the clock count value corresponds to the second set value, it outputs a corresponding signal as a second timing signal. The microcomputer 22 is activated at this timing, waits for a radio signal to be transmitted, and receives the radio signal.

Figure 2:
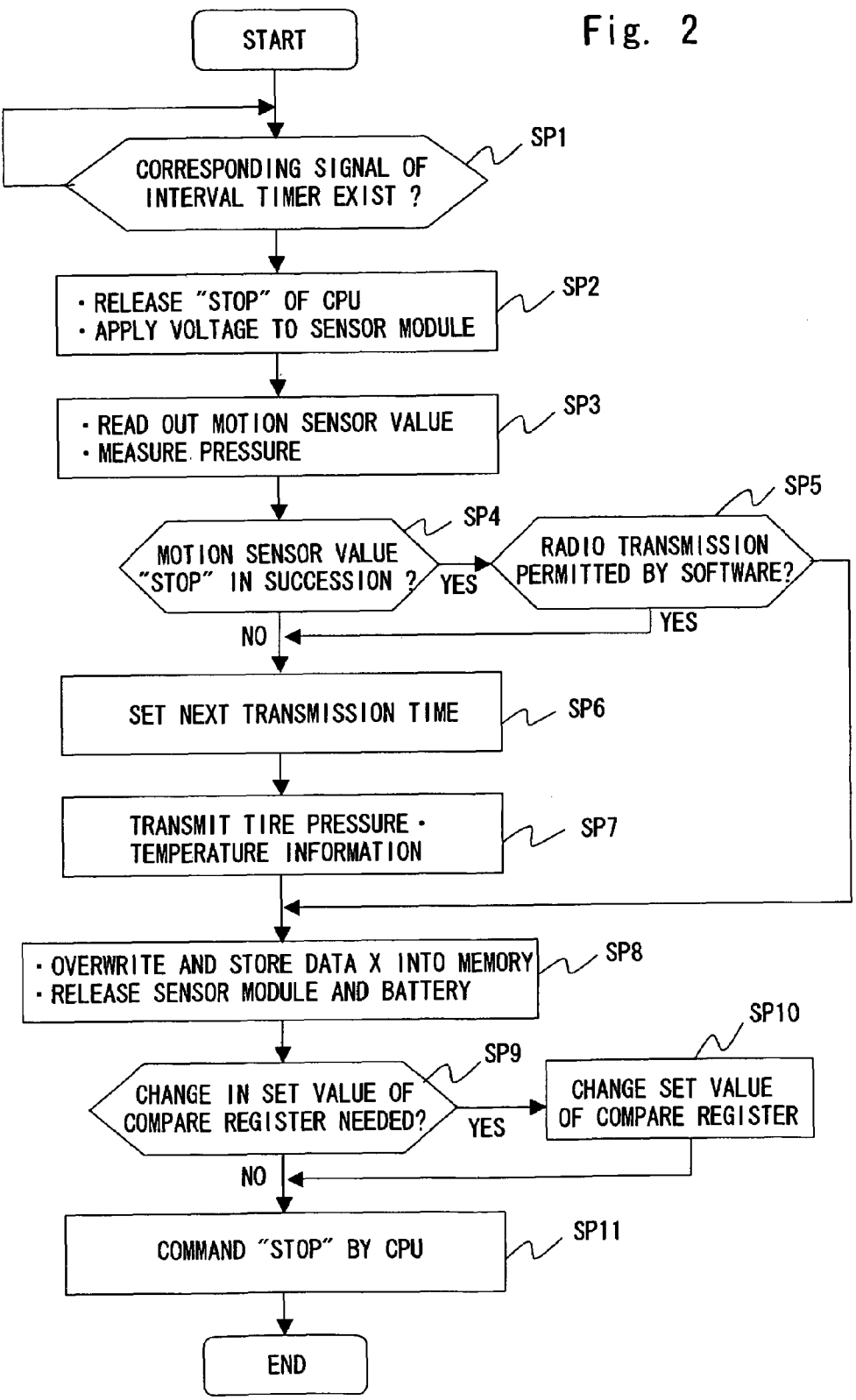
FIG. 2 is a flowchart showing the operation of the tire pressure monitoring system.
Figure 3:
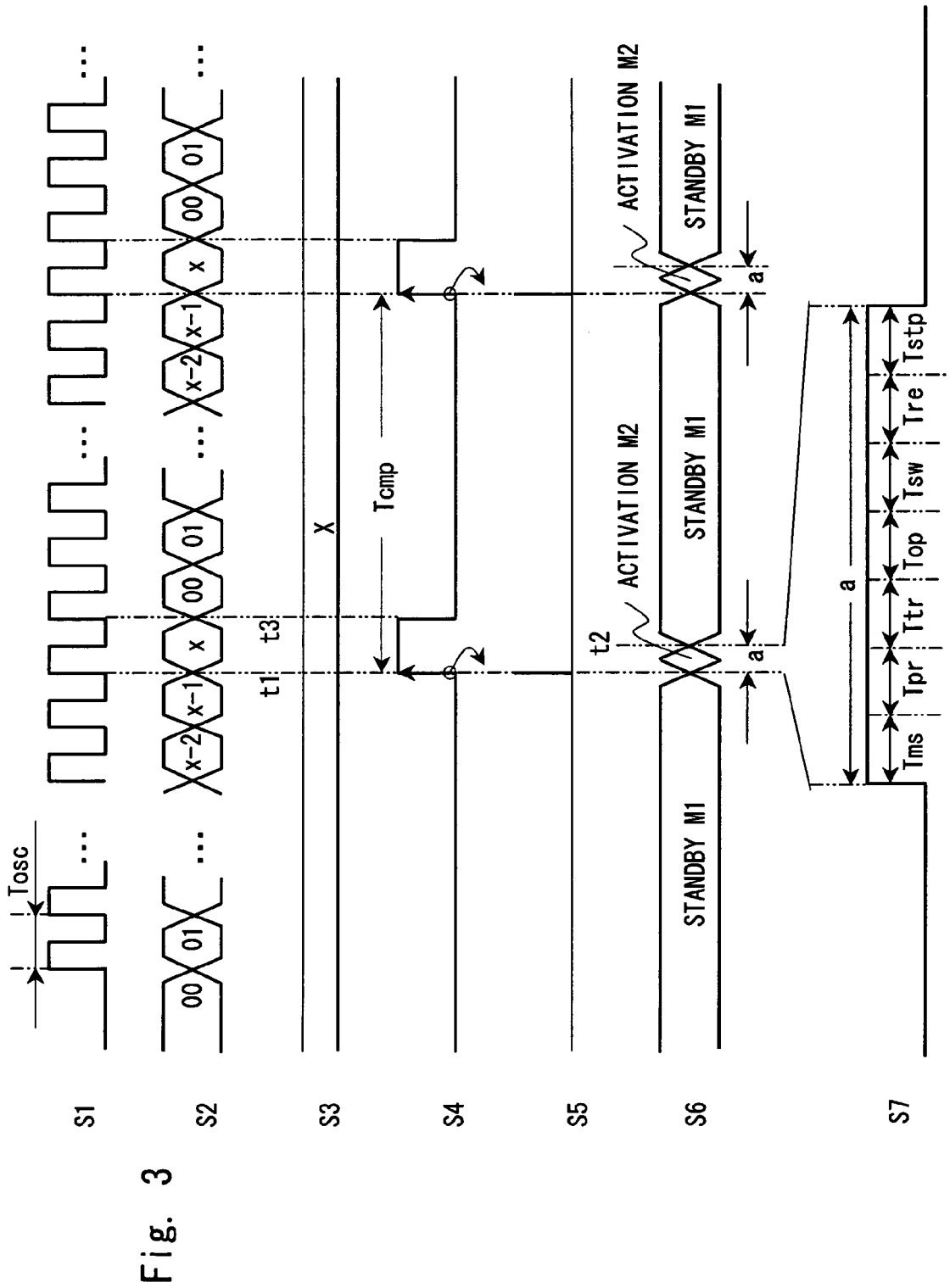
FIG. 3 is a timing chart in the tire pressure monitoring system where S1 is an output waveform of a low-current oscillator, S2 is a count value of an interval timer, S3 is a corresponding signal set value of the interval timer, S4 is a corresponding signal of the interval timer, S5 is an activation signal of a CPU, S6 indicates the state of a microcomputer, and S7 shows the processing timing in the operation of the CPU.

The operation of the tire pressure monitoring system of this embodiment is described hereinafter. FIG. 2 is a flowchart showing the operation of the tire pressure monitoring system. FIG. 3 is a timing chart in the tire pressure monitoring system. In FIG. 3, S1 is an output waveform of the low-current oscillator 23, S2 is a count value of the interval timer 24, S3 is a corresponding signal set value of the interval timer 24, S4 is a corresponding signal of the interval timer 24, S5 is an activation signal of the CPU 26, S6 shows the state of the microcomputer 22, and S7 shows the processing timing in the operation of the CPU 26.

The following description describes the case where the timing of counting in the interval timer 24 corresponds to the rise of the count clock output from the low-current oscillator 23, as shown in S1 and S2 of FIG. 3. In FIG. 3, the count clock period of the low-current oscillator 23 is indicated by "Tosc". The period where the microcomputer 22 is activated by the corresponding signal of the interval timer 24, returns to the standby state, and is again activated by the next corresponding signal, which is a tire pressure monitoring period, is indicated by "Tcmp". The activation period of the microcomputer 22 is indicated by "a". As described later, the tire pressure monitoring period Tcmp is a variable interval.

First, the interval timer 24 counts the count clock of the low-current oscillator 23. When the count value of the interval timer 24 shown by S2 of FIG. 3 corresponds to the first set value (corresponding signal set value) "X", shown by S3 of FIG. 3, stored in the compare register 28 of the interval timer 24 at timing t1, a corresponding signal is generated as shown by S4 of FIG. 3.

In synchronization with the corresponding signal, the interval timer 24 generates an activation signal of the CPU 26 of the microcomputer 22 as shown by S5 of FIG. 3. The microcomputer 22 is thereby released from the STOP state (M1) where no clock is supplied to the CPU 26 and enters the activated state (M2). Entering the activated state M2, the CPU 26 outputs a control signal to the switch 42. The switch 42 thereby switches ON so that a voltage is supplied from the power source 41 to each sensor of the sensor module 11 (Step SP2). The microcomputer 22 and the radio transmitter module 31 are always connected to the power source 41.

When the CPU 26 is released from the standby state M1 at the timing t1, the electrical state of the motion sensor 13 is read out by the read signal from the CPU 26 and output to the interval timer 24. Then, the interval timer 24 compares the sensor output read out from the motion sensor 13 with a comparative value stored in the register, not shown, of the interval timer 24, and retains a comparison result indicating the present vehicle operation state. The microcomputer 22 reads out this result. In the case of using the acceleration sensor as the motion sensor 13 as well, the electrical output of the acceleration sensor is loaded to the microcomputer 22. In this case, however, since the output of the acceleration sensor is an analog signal, the electrical output is loaded via the A/D converter amplifier 25 as shown by the dotted line in FIG. 1. At the same time, a voltage is supplied to the sensor module 11 and each sensor thereby starts measuring (Step SP3; "Tms" in S7 of FIG. 3).

Then, if the data (electrical state) from the motion sensor 13 loaded to the microcomputer 22 indicates DRIVE (NO in SP4), the CPU 26 sets "0" to the data K stored in the memory 27. On the other hand, if it indicates STOP (YES in SP4), the CPU 26 reads out the data K already stored in the memory 27 and adds "1" to this value, thereby setting a new value to the data K.

The microcomputer 22 has a function to transmit the sensor output of the pressure sensor 12 to the receiver module 3. When the present vehicle operation state indicates DRIVE, the microcomputer 22 permits data transmission. When it indicates STOP, the microcomputer 22 determines whether to permit data transmission. If it is determined that STOP indicates parking, not waiting at stoplights or the like, there is no need to transmit data as frequently as during driving. Further, when a change in the tire pressure is not likely to occur, such as when the vehicle is stopped for a long time, the frequency to transmit the sensor data may be further reduced. The microcomputer 22 determines the transmission timing according to the data K.

For example, since a vehicle normally repeats driving and stopping when it is driving, even if the motion sensor 13 indicates STOP several times in a row or the data K is 2 or above, it is not necessarily possible to determine that the vehicle is parked. Thus, when STOP is repeated several times in succession, the transmission timing can be changed. For example, the transmission of a radio signal may be permitted only when the data K is equal to or more than a predetermined value specified by software stored in ROM or the like in the microcomputer 22 (YES in SP5).

Then, the signal processor module 21 reads out the values of the pressure sensor 12 and the temperature sensor 14 (Tpr in S7 of FIG. 3), and calculates information indicating an estimated time to transmit a radio signal next time (estimated next transmission time data) by the process described later and sets the value (SP6). Then the signal processor module 21 wirelessly transmits the information on the pressure sensor and the temperature sensor and the estimated next transmission time data through the radio transmitter module 31 (SP7; Ttr in S7 of FIG. 3).

In this embodiment, the information on the temperature sensor is used to calculate variation in the oscillation frequency Tosc of the low-current oscillator 23, which is described later, and also transmitted to the receiver module 3 together with a pressure detection result. It is thereby possible to absorb the variation in the oscillation frequency Tosc due to temperature and inform a user of anomaly in the tire temperature or the like in addition to the pressure detection result. Further, it is feasible to use the temperature detection result also for determining whether to permit transmission. On the contrary, the temperature sensor 14 may be used only for absorbing variation in the oscillation frequency Tosc due to temperature. In such a case or in the case where the temperature sensor 14 is not placed in the transmitter module 2, the output of the pressure sensor 12 only is transmitted to the receiver module 3.

After transmitting the radio signal, the data K set according to the present vehicle operating state read out in the step SP3 is overwritten and stored in the memory 27 (Top in S7 of FIG. 3). Then, the power source 41 is opened up to stop the sensor module 11 (SP8; Tsw in S7 of FIG. 3). After that, it is determined whether to update an interval timer corresponding signal set value X of the compare register 28 (SP9). When updating the value X, the set value of the compare register 28 is changed (SP10; Tre in S7 of FIG. 3). Finally, the CPU 26 returns to the STOP state (SP11; Tstp in S7 of FIG. 3). As described above, the corresponding signal set value X indicates the activation period of the microcomputer 22 and the sensor module 11. Thus, power consumption is lower if the corresponding signal set value X is larger. Therefore, the microcomputer 22 reviews the corresponding signal set value X and adjusts its setting according to the value of the data K, thereby eliminating an unnecessary operation.

On the other hand, if the output data (electrical state) of the motion sensor 13 indicates STOP, the process is as follows. As described above, the period Tms in S7 of FIG. 3 is the time period when the CPU 26 reads out the result that the interval timer 24 determines whether the vehicle is stopped or driving according to the electrical data of the motion sensor 13 or the output from the motion sensor 13. Meanwhile, the pressure sensor 12 and the temperature sensor 14 start the measurement at the same time as the activation of the CPU 26. After the period Tms, in response to the data read signal, the outputs of the pressure sensor 12 and the temperature sensor 14 are loaded to the CPU 26 via the A/D converter amplifier 25 in the period Tpr.

If the output data indicates STOP, that is, when the output data is an intermediate voltage and the interval timer 24 detects STOP in this embodiment, there are two options. The first is performing no radio transmission, determining that tire pressure monitoring is not necessary. The second is performing radio transmission. If the interval timer 24 detects DRIVE, radio transmission is performed in all cases. The tire pressure monitoring is determined to be unnecessary when, for example, a vehicle is stopped for a long time or parked. The vehicle may be determined to be parked when the data K stored in the memory 27 reaches a predetermined value, which is, when the number of times when the output data (electrical state) of the motion sensor 13 indicates STOP is equal to or greater than a predetermined value, for example. The data K may be set to a desired value by software.

The first case is described below. If the tire pressure monitoring is determined to be unnecessary and radio transmission is not performed, that is, when a vehicle is determined to be stopped and the data K stored in the memory 27 has not reached a threshold value for permitting the transmission in stopping, radio transmission by the radio transmitter module 31 is not performed in the period Ttr in S7 of FIG. 3. In this case, the data K is overwritten and stored in the memory 27 in the subsequent period Top. Specifically, new data K that increments the existing data K stored already is saved.

Than, in the period Tsw, the switch 42 is released by the control signal from the CPU 26. In the period Tre, the corresponding signal set value of the interval timer 24 of the compare register 28 is set to a value X' which is larger than the present set value X. In the period Tstp, it enters the STOP state (Standby state M1) again by the instruction of the CPU 26. The corresponding signal set value X' of the compare register 28 may not have a new value but may maintain the present set value.

On the other hand, the second case performs radio transmission. First, as in the first case, the data from the motion sensor 13 is loaded in the period Tms, and the values of the pressure sensor 12 and the temperature sensor 14 are loaded in the period Tpr. Then, at least the pressure data and the estimated next transmission time are transmitted in the period Ttr. The data K indicating the number of stop times stored in the memory 27 is overwritten in the period Top. The switch 42 is released in the period Tsw. The set value X of the interval timer 24 is changed if needed in the period Tre. Finally, it returns to the STOP state in the period Tstp. In this case also, the set value of the compare register 28 may not be changed but left the same.

The selection made when the output data (electrical state) of the motion sensor 13 is STOP is predetermined by algorithm of software stored in ROM or the like, which is not shown, placed in the microcomputer 22. When STOP is detected in the second or later time in succession, the selection may be made according to the algorithm of software. For example, the corresponding signal set value X may be set larger so as to extend the tire pressure monitoring period Tcmp, or it may be the same so as to retain the tire pressure monitoring period Tcmp X set large or the tire pressure monitoring period Tcmp set long in the first time.

By extending the tire pressure monitoring period Tcmp, the number of times of activating the microcomputer 22 and the sensor module 11 is reduced. This extends a time period until the data K indicating the number of STOP times reaches a given value to extend a time period until a radio signal is transmitted to the receiver module 3. Alternatively, the tire pressure monitoring period Tcmp may be constant, that is, the corresponding signal set value X set to the compare register 28 may be fixed so that the comparative value with the data K stored in the memory 27 is larger. Specifically, when it is set so that radio transmission is performed at K=k, if the radio transmission is permitted at K=k last time as well, a vehicle is possibly parked for a long time. Thus, if a condition to transmit a radio signal next time is set to K=2k, for example, it is possible to extend a time period until transmitting a radio signal and reduce the power consumption in the transmitter module 2 and the receiver module 3.

In the case where STOP is not detected, radio transmission is always performed and K=0 is overwritten to the data K stored in the memory 27 and saved. Specifically, just like the second case described above, the data is loaded from the motion sensor 13 in the period Tms, and the values of the pressure sensor 12 and the temperature sensor 14 are also loaded in the period Tpr. Then, new data is overwritten to the data K=0 stored in the memory 27 in the period Top. The switch 42 is released in the period Ttr so that radio transmission is performed. Then, if needed, the corresponding signal set value X of the compare register 28 is set larger or smaller than the present set value in the period Tre. Finally, it returns to the STOP state in the period Tstp.

Figure 4:
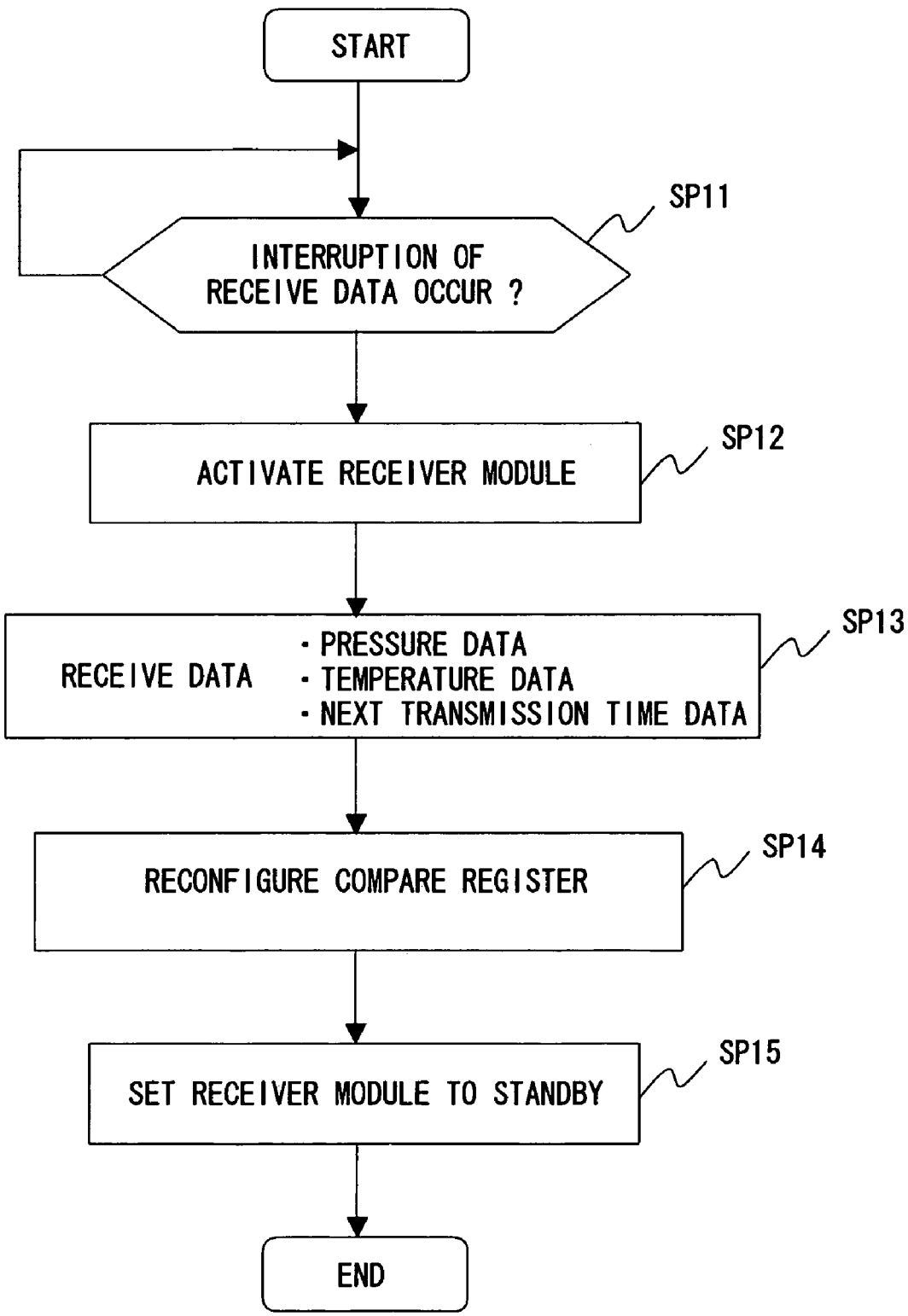
FIG. 4 is a flowchart showing the operation of a receiver module in the tire pressure monitoring system.
Figure 5:
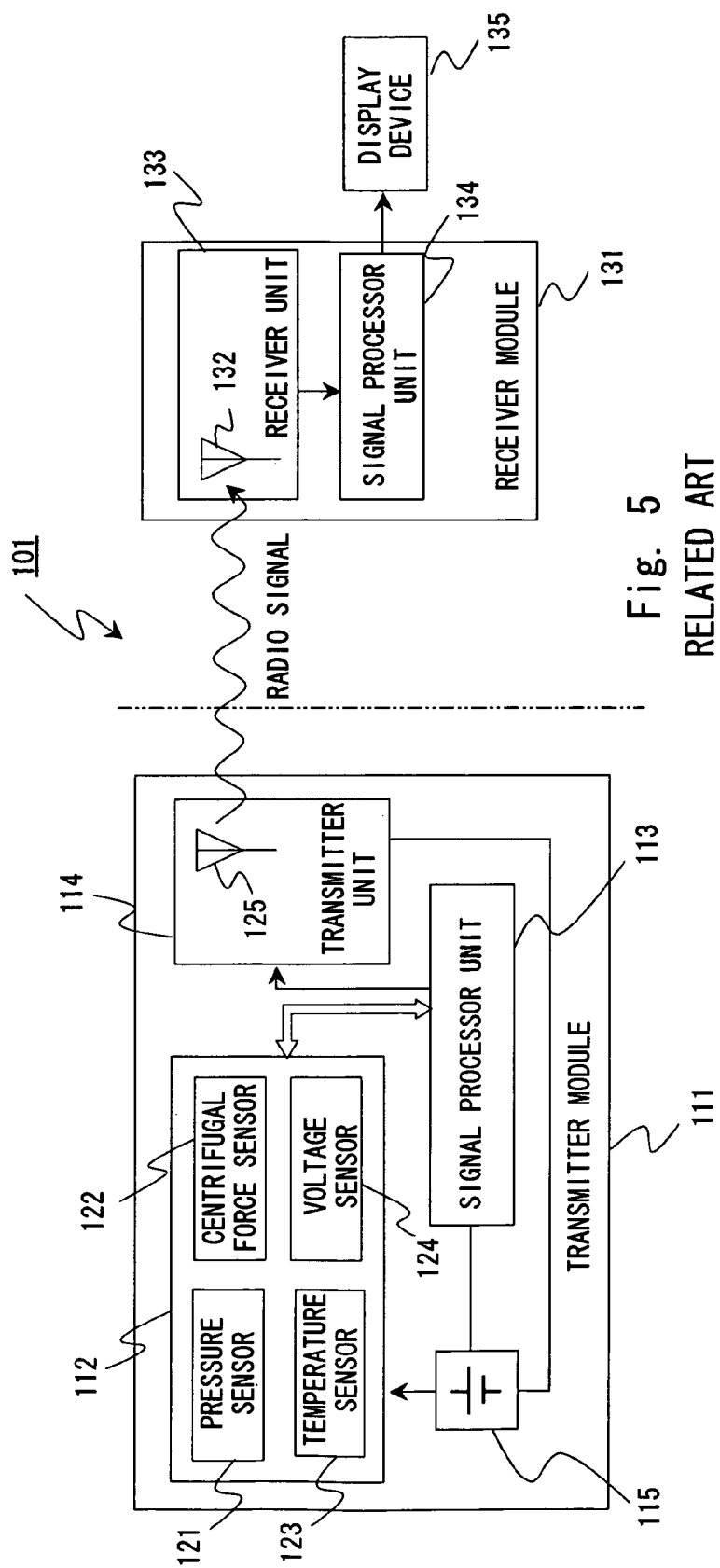
FIG. 5 is a block diagram showing a transmitter module in a tire internal pressure warning device of the related art.

FIG. 4 is a flowchart showing the operation of the receiver module 51. The receiver side is activated prior to the estimated next transmission time contained in the data of the previous radio transmission regardless of on/off of the main key in the vehicle side. As described above, the data of radio transmission contains two kinds of data: estimated next transmission time and measurement data of each sensor. The estimated next transmission time may be calculated by the period Tosc (sec) of the low-current oscillator 23 and the tire pressure monitoring period Tcmp, which is the set value X of the compare register 28 of the interval register 24. If the interval timer 24 counts up at the rise timing of the low-current oscillator 23, the estimated next transmission time Tnx (sec) can be obtained by the following formula:

$$Tnx = X * Tosc \qquad \text{Formula 1}$$

Since the transmitter module 2 of the tire pressure monitoring system 1 is installed in the tire, its temperature varies significantly. Further, since variation of the oscillation frequency due to temperature is not negligible in the low-current oscillator 23, the time Tnx also varies widely. Therefore, if the factor indicating the variation in the oscillation frequency Tosc in the low-current oscillator 23 is "α", the above formula 1 is as follows:

$$Tnx = Tcmp * \alpha Tosc \qquad \text{Formula 2}$$

The temperature characteristics against the oscillation frequency of the low-current oscillator 23 is measured in advance and incorporated into the algorithm of the software. The factor α is calculated based on the temperature data obtained from the temperature sensor 14. The receiver module 3 which has received Tnx of Formula 2 overwrites and updates a compare register of an interval timer in the receiver signal processor module 53 each time immediately before STOP command by the receiver intermittent activation. It is activated slightly earlier than Tnx and stands ready so as to make sure to capture the radio transmission.

In the transmitter module 2, a time to actually transmit the output of the pressure sensor 12 can be different from an estimated transmission time due to a change in the corresponding signal set value X of the compare register 28 or in a threshold value of permission to transmit the data K indicating the number of successive stop times. However, the set value X is not changed significantly at a time and the transmission timing is changed gradually. The receiver module 3 is activated in a time capable of absorbing such a lag.

The microcomputer 22 consumes less current in the STOP state than in the CPU 26 operating state. Extending the tire pressure monitoring period Tcmp reduces the number of activations, which lowers integrated current consumption. Thus, the current consumption is lower than in the related art where the tire pressure monitoring period Tcmp is fixed. It is thereby possible to effectively use the battery and improve the battery life.

This embodiment changes the transmission timing of the output from the pressure sensor 12 according to the value of the data K, such as 0 or a predetermined threshold value, depending on "driving" or "parked". Thus, it changes the transmission timing by changing the threshold value of the data K. Further, this embodiment reviews the set value X of the interval timer each time the microcomputer 22 is activated. Then, upon detection of a predetermined state such as "parked", for example, the set value X of the interval timer is set to a larger value so as to extend the tire pressure monitoring period Tcmp. By reviewing and adjusting the transmission timing and the activation timing of the microcomputer 22, it is possible to monitor the tire pressure efficiently and avoid unnecessary monitoring, thereby reducing power consumption.

In the related art described earlier, when a vehicle is stopped and its main switch is off, the receiver module 131 is intermittently activated asynchronous with the transmitter module 111. Therefore, the receiver module 131 performs intermittent activation even when no radio signal is transmitted from the transmitter module 111, thus unnecessarily consuming current. Further, the transmitter module 111 continuously performs radio transmission during an interruption period of the clock 2 in order to make sure that the receiver module 131 captures data, thus being inefficient. On the contrary, in the present embodiment, the receiver module 3 operates in synchronization with the transmitter module 2 since it receives activation timing data in the estimated transmission time information from the transmitter module 2. This eliminates unnecessary intermittent activation under no radio transmission, which occurs in the asynchronous operation. This also eliminates the need for extending each transmission time in order to receive the data for sure. It is thereby possible to reduce current consumption and lower load on the battery placed in the vehicle body.

The present invention is not limited to the embodiment described above but may be modified and changed without departing from the scope and spirit of the invention. For example, when the microcomputer 22 is in the STOP state, only the low-current oscillator 23 and the interval timer 24 operate. If the oscillation frequency of the low-current oscillator 23 is an extremely low frequency with a seconds or longer period, for example, a current consumed by the low-current oscillator 23 and the interval timer 24 can be further reduced. The period for measuring the tire pressure is several dozens of seconds at shortest, and one clock is sufficient for the interval timer 24 to generate a corresponding signal. Thus, the extremely low frequency oscillation allows sufficient monitoring of the tire pressure while further reducing power consumption.

Specifically, since the low-current oscillator 23 and the interval timer 24 constantly operate regardless of the vehicle operation state, the extremely low frequency oscillation is significantly effective in reducing integrated current. It is thus possible to greatly contribute to the improvement in the life of the power source 41.

Generally, the oscillator supplies a constant frequency pulse to the microcomputer 22. However, the microcomputer 22 has a number of other lines closely integrated with each other. Thus, capacitance exists between these lines and a clock supply line. The capacitor is repeatedly charged and discharged by the clock changing at a constant frequency. Thus, the charge/discharge frequency is higher in a high-frequency clock than in a low-frequency clock, and a current flowing into the microcomputer 22 increases accordingly. Thus, use of the low-frequency clock allows reduction in power consumption. Further, when counting the same time, use of the low-frequency clock as a timer count clock is advantageous than the high-frequency clock since it can eliminate a counter circuit.

As described in the foregoing, reduction in power consumption is required in both the transmitter module and the receiver module. To meet this requirement, this embodiment has focused on the fact that most vehicles are parked longer time than driving. This embodiment performs the receiving operation of the receiver module in time with the transmitting operation by intermittently activating the receiver module at necessary timings, transmitting the sensor output at necessary timings, and further transmitting an estimated next transmission time together with the sensor output. It is thereby possible to achieve effective and low power consumption while measuring the tire pressure.

Further, by using an extremely low-frequency oscillator as a low-frequency oscillator for supplying a count clock to the interval timer 24 which constantly operates until the end of device life, it is possible to save the power source 41 of the transmitter module 2 and reduce a load on the vehicle battery.

Although the above embodiment describes the tire pressure monitoring system in which a monitored object state is the tire pressure and a monitoring device is a receiver module, the monitored object is not limited to a vehicle tire as long as it is an object whose given state should be detected and whose physical state is detectable by a sensor or the like. Further, the monitored object state is not limited to the tire pressure. The monitoring device of the present invention suppresses power consumption by determining whether to perform monitoring operation according to the physical state of a monitored object. The transmission control system of the present invention further suppresses power consumption by controlling whether to permit transmission of the result of detecting the state of a monitored object according to the physical state of the monitored object.

Specifically, the monitoring device and the transceiver system of the present invention may be applied to various systems including a stolen car automatic position monitoring system, a gas meter remote monitoring system, a river water monitoring system, a greenhouse temperature monitoring system, and a road heating monitoring system.

An example of application to a stolen car automatic position monitoring system is as follows. A transmitter device as a position monitoring device for monitoring the present position is placed in a vehicle. The position monitoring device has a function to receive a request signal from an owner of the vehicle. The position monitoring device includes a motion sensor for detecting the physical state, driving or stopped, of a vehicle, and a position recognition device for measuring the present position, which corresponds to the state detection sensor described above. A receiver device, which is held by the owner, has a function to transmit the request signal. The owner transmits the request signal to the position monitoring device upon occurrence of vehicle theft, for example. This triggers the position monitoring device to start measuring the present position and transmits the detected present position to the receiver device in accordance with the operation state of the vehicle.

An example of application to a gas meter remote monitoring system is as follows. A transmitter device as a usage monitoring device for monitoring a gas usage amount is placed in a gas meter, for example. The usage monitoring device has a function to receive a request signal from those who collect gas charges. The usage monitoring device includes a sensor for detecting on/off of the gas meter and a sensor for detecting the present operation state of the gas meter, which corresponds to the state detection sensor described above. A receiver device has a function to transmit the request signal. A system user such as a charge collector transmits the request signal to the usage monitoring device. In response to the signal, the usage monitoring device detects the present state of the gas meter and transmits a detection result or a usage amount calculated from the detection result to the receiver device.

An example of application to a river water monitoring system is as follows. A transmitter device as a water level monitoring system for monitoring the water level of a river is placed in an appropriate location of the river. The water level monitoring device has a function to receive a request signal from a system user. The water level monitoring device includes a sensor for detecting presence or absence of rainfall and a sensor for detecting the water level of the river, which corresponds to the state detection sensor described above. A receiver device has a function to transmit the request signal. The system user transmits the request signal to the water level monitoring device. In response to the signal, the water level monitoring device automatically detects the present water level of the river when it rains and transmits a detection result to the receiver device.

An example of application to a greenhouse temperature monitoring system is as follows. A transmitter device as a temperature monitoring system for monitoring the temperature in a greenhouse is placed in the greenhouse. The temperature monitoring device has a temperature sensor that detects a temperature variation in the greenhouse, which corresponds to the state of the vehicle described above and measures the present room temperature. The temperature monitoring device shortens a stop period when the greenhouse temperature varies widely, and it extends the stop period when the greenhouse temperature varies only slightly, thereby measuring the room temperature intermittently while achieving low power consumption. If a temperature below or above a given degree is detected, the device transmits this information to an external receiver device, thereby informing a greenhouse manager or the like of temperature anomaly in the greenhouse.

An example of application to a road heating monitoring system is as follows. A transmitter device as a temperature monitoring device for monitoring the temperature of a road, ground, and so on as a monitored object is placed in an appropriate location of the monitored object. A receiver device is placed in a boiler or the like of the road heating. The temperature monitoring device measures a change in outside air and, when the outside air is a given temperature or above, the device extends the stop period; when the outside air is less than the given temperature, the device shortens the stop period, thereby monitoring the temperature of a monitored object. If freeze of the monitored object is detected, the device notifies the receiver device of the occurrence of freeze. Receiving this notice, the receiver device outputs an operation start signal, for example, to automatically start the boiler, thus automatically preventing the freeze of a road or the like from occurring.

It is apparent that the present invention is not limited to the above embodiment that may be modified and changed without departing from the scope and spirit of the invention.

What is claimed is:

1. A transceiver system comprising:
a transmitter device monitoring a state of a monitored object and transmitting a monitoring result; the transmitter device comprising
a sensor unit including a state detection sensor detecting the state of the monitored object, and a motion sensor detecting a physical operation of the monitored object,
a transmitter signal processor section causing the state detection sensor to operate according to an output of the motion sensor, and
a transmitter section transmitting a detection result of the state detection sensor; and
a receiver device receiving data from the transmitter device,
wherein
the sensor unit operates intermittently by repeating an operation period and a stop period,
the motion sensor detects the physical operation of the monitored object in the operation period, and
the transmitter signal processor section changes an operation timing when the sensor unit operates next time according to past and/or present physical operation of the monitored object.

2. The transceiver system of claim 1, wherein
the transmitter signal processor section changes a permission timing for permitting transmission of the detection result of the state detection sensor to the receiver device according to the past and/or present physical operation of the monitored object detected by the motion sensor, and
the transmitter section transmits the detection result of the state detection sensor when the transmitter signal processor section permits the transmission.

3. The transceiver system of claim 2, wherein the transmitter signal processor section includes a transmitter timing generator section generating a first timing signal indicating a start timing of an operation of the sensor unit, and a transmitter control section activated by the first timing signal and setting a period of the first timing signal generated by the transmitter timing generator section according to the past and/or present physical operation of the monitored object.

4. The transceiver system of claim 3, further comprising a power supply section supplying power to the sensor unit, wherein the transmitter control section controls whether to permit power supply from the power supply section to the sensor unit according to the first timing signal.

5. The transceiver system of claim 3, wherein
the transmitter timing generator section includes a transmitter clock generator section and a first timing signal output section outputting the first timing signal if a count value of a clock of the transmitter clock generator section corresponds to a first set value, and
the transmitter control section changes the first set value according to the past and/or present physical operation of the monitored object.

6. The transceiver system of claim 3, wherein
the transmitter signal processor section counts the number of times when the physical operation of the monitored object in the operation period is stopped and permits transmission of the detection result of the state detection sensor to the receiver device if the count value is equal to or higher than a given threshold value, and
the transmitter control section changes the given threshold value according to the physical operation of the monitored object.

7. The transceiver system of claim 3, wherein
the transmitter signal processor section outputs a period when the transmitter timing generator section generates the first timing signal as estimated next transmission time information indicating an estimated time to transmit the detection result of the state detection sensor next time, and
the transmitter section transmits the detection result of the state detection sensor and the estimated next transmission time information to the receiver device.

8. The transceiver system of claim 2, wherein the transmitter signal processor section permits transmission of the detection result of the state detection sensor to the receiver device if a period when the physical operation of the monitored object is determined to be stopped is equal to or longer than a given period.

9. The transceiver system of claim 1, wherein
the transmitter signal processor section outputs estimated next transmission time information indicating an estimated time to transmit the detection result of the state detection sensor next time, and
the transmitter section transmits the detection result of the state detection sensor and the estimated next transmission time information to the receiver device.

10. The transceiver system of claim 9, wherein the receiver device comprises a receiver section receiving a radio signal from the transmitter device according to the estimated next transmission time information in a previous time, and a receiver signal processor section extracting and outputting data for monitoring the state of the monitored object according to the detection result of the state detection sensor.

11. The transceiver system of claim 9, wherein the receiver signal processor section includes a receiver timing generator section generating a second timing signal indicating a start timing of an operation of receiving the radio signal, and a receiver control section setting a period of the second timing signal generated by the receiver timing generator section according to the estimated next transmission time information.

12. The transceiver system of claim 11, wherein the receiver timing generator section includes a receiver clock generator section and a second timing signal output section outputting the second timing signal if a count value of a clock of the receiver clock generator section corresponds to a second set value, and
the receiver control section changes the second set value according to the estimated next transmission time information.

13. The transceiver system of claim 9, further comprising means for turning off the receiver section during time periods other than a time period corresponding to a next time when the transmitter signal processor section will be transmitting information to the receiver section.

14. The transceiver system of claim 1, wherein the transmitter device and the receiver device are turned off and on in synchronism with each other.

15. The transceiver system of claim 1, wherein the transmitter signal processor section comprises:
a microcomputer configured to determine the operation timing of the sensor unit;
an interval timer configured to count a time interval and to provide a time count signal to the microcomputer; and
a low-current oscillator configured to provide a stable oscillation signal to the interval timer,
wherein the low-current oscillator and the interval timer are kept in an ON state and the microcomputer is placed in an OFF state when the transmitter device is turned off in synchronism with the stop period of the sensor unit.

16. A control method of a transceiver system including a transmitter device including a sensor unit having a state detection sensor detecting a state of a monitored object and a motion sensor detecting a physical operation of the monitored object, and a transmitter section transmitting a detection result of the state detection sensor; and a receiver device receiving data from the transmitter device, the control method comprising:
detecting by the motion sensor the physical operation of the monitored object; and
causing the state detection sensor to operate according to a detection result of the physical operation,
wherein
the sensor unit operates intermittently by repeating an operation period and a stop period,
the motion sensor detects the physical operation of the monitored object in the operation period, and
an operation timing when the sensor unit operates next time is changed according to past and/or present physical operation of the monitored object detected by the motion sensor.

17. The control method of the transceiver system of claim 16, wherein
a permission timing for permitting transmission of the detection result of the state detection sensor to the receiver device is set according to past and/or present physical operation of the monitored object detected by the motion sensor, and
the detection result of the state detection sensor is transmitted from the transmitter section to the receiver section at the permission timing.

18. The control method of the transceiver system of claim 16, further comprising:

turning off the receiver device during time periods other than a time period corresponding to a next time when the transmitter section will be transmitting information to the receiver device.

19. The control method of the transceiver system of claim 16, wherein the transmitter device and the receiver device are turned off and on in synchronism with each other.

20. A monitoring device comprising:
a state detection sensor detecting a state of a monitored object;
a motion sensor detecting a physical operation of the monitored object; and
a signal processor section causing the state detection sensor to operate according to an output of the motion sensor,
wherein
the state detection sensor operates intermittently by repeating an operation period and a stop period,
the motion sensor detects the physical operation of the monitored object in the operation period, and
an operation timing when the state detection sensor operates next time is changed according to past and/or present physical operation of the monitored object detected by the motion sensor.

21. The monitoring device of claim 20, wherein the motion sensor detects a variation in past and/or present physical operation of the monitored object.

22. The monitoring device of claim 20, further comprising a transmitter section transmitting a detection result of the state detection sensor.

23. The monitoring device of claim 20, further comprising a built-in battery, wherein the signal processor section, the state detection sensor, and the motion sensor operate with power supply from the battery.

* * * * *